United States Patent
Owada et al.

(10) Patent No.: US 12,078,313 B2
(45) Date of Patent: Sep. 3, 2024

(54) VEHICULAR LAMP AND OPTICAL ELEMENT

(71) Applicant: Stanley Electric Co., Ltd., Tokyo (JP)

(72) Inventors: Ryotaro Owada, Tokyo (JP); Yasuo Toko, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/032,870

(22) PCT Filed: Oct. 6, 2021

(86) PCT No.: PCT/JP2021/036924
§ 371 (c)(1),
(2) Date: Apr. 20, 2023

(87) PCT Pub. No.: WO2022/085445
PCT Pub. Date: Apr. 28, 2022

(65) Prior Publication Data
US 2023/0392765 A1    Dec. 7, 2023

(30) Foreign Application Priority Data
Oct. 23, 2020    (JP) ................. 2020-177829

(51) Int. Cl.
*F21S 41/64*    (2018.01)
*F21S 41/147*    (2018.01)
(Continued)

(52) U.S. Cl.
CPC .......... *F21S 41/645* (2018.01); *F21S 41/147* (2018.01); *F21S 41/25* (2018.01); *F21S 41/365* (2018.01)

(58) Field of Classification Search
CPC ...... F21S 41/285; F21S 41/147; F21S 41/321; F21S 41/25; F21S 41/64; F21S 41/365; F21S 41/645
See application file for complete search history.

(56) References Cited

U.S. PATENT DOCUMENTS 10,408,409 B2 *  9/2019  Ohno .................... F21S 41/255
10,955,107 B1    3/2021  Toyoshima et al.
(Continued)

FOREIGN PATENT DOCUMENTS

| JP | 2018-185895 A | 11/2018 |
| JP | 2019-033030 A | 2/2019 |
| JP | 2020-013697 A | 1/2020 |

OTHER PUBLICATIONS

International Search Report for PCT/JP2021/036924 dated Dec. 21, 2021.

*Primary Examiner* — Zheng Song
(74) *Attorney, Agent, or Firm* — KENEALY VAIDYA LLP

(57) ABSTRACT

In a vehicular lamp, a polarization rotation element is disposed only in an optical path of second light from a second reflector toward a PBS, first light and the second light condensed toward a liquid crystal element are condensed at a first condensing point in common, the liquid crystal element is located at the first condensing point, the second light reflected by the PBS is condensed at a second condensing point deviated from the optical path of the light from a first reflector toward the PBS and the optical path of the second light from the second reflector toward the PBS.

12 Claims, 8 Drawing Sheets

(51) Int. Cl.
*F21S 41/25* (2018.01)
*F21S 41/365* (2018.01)

(56) References Cited

U.S. PATENT DOCUMENTS

| | | | | |
|---|---|---|---|---|
| 2011/0013412 | A1* | 1/2011 | Kobayashi | B60Q 1/085 |
| | | | | 362/538 |
| 2014/0268837 | A1* | 9/2014 | Simchak | F21S 41/645 |
| | | | | 362/465 |
| 2016/0077402 | A1* | 3/2016 | Takehara | F21S 41/645 |
| | | | | 349/33 |
| 2016/0377251 | A1* | 12/2016 | Kim | B60Q 1/14 |
| | | | | 362/466 |
| 2019/0219242 | A1* | 7/2019 | Sugiyama | F21S 45/10 |
| 2019/0390836 | A1* | 12/2019 | Hirata | G02F 1/13 |
| 2020/0011501 | A1* | 1/2020 | Kunii | F21V 7/22 |
| 2020/0025350 | A1 | 1/2020 | Owada | |
| 2020/0056755 | A1* | 2/2020 | Zhang | F21S 41/135 |
| 2021/0155149 | A1* | 5/2021 | Sugiyama | F21S 41/148 |
| 2023/0097767 | A1* | 3/2023 | Sato | F21S 41/255 |
| | | | | 362/539 |

* cited by examiner

VEHICULAR LAMP AND OPTICAL ELEMENT

This application is a U.S. National Stage Application under 35 U.S.C § 371 of International Patent Application No. PCT/JP2021/036924 filed Oct. 6, 2021, which claims the benefit of priority to Japanese Patent Application No. 2020-177829 filed Oct. 23, 2020, the disclosures of all of which are hereby incorporated by reference in their entireties.

TECHNICAL FIELD

The present invention relates to a vehicular lamp and an optical element.

Priority is claimed on Japanese Patent Application No. 2020-177829, filed Oct. 23, 2020, the content of which is incorporated herein by reference.

BACKGROUND ART

In recent years, development of a variable light distribution headlamp (adaptive driving beam (ADB)) configured to variably control a light distribution pattern of light projected forward from a vehicle has been underway. The ADB is a technology of enlarging a field of vision in front of a driver at nighttime by recognizing a peripheral situation of a preceding vehicle, an oncoming vehicle, or the like, using an in-vehicle camera and shielding light that gives glare to the preceding vehicle or the oncoming vehicle.

Incidentally, as one method of realizing such vehicular lamps, light emitted from a light source is separated into light with two polarized components, and each of the light of the polarized components is controlled and used in liquid crystal elements (for example, see the following Patent Document 1).

For example, the following Patent Document 1 discloses a lamp unit including a light source, a reflection polarizing plate disposed at a position where light from the light source enters, a reflecting mirror configured to reflect the reflected light generated by the reflection polarizing plate and cause the reflected light to reenter the reflection polarizing plate, a liquid crystal device disposed on the side of a light emission surface of the reflection polarizing plate, a polarization plate disposed on the side of a light emission surface of the liquid crystal device, and a lens disposed on the side of a light emission surface of the polarization plate.

In addition, the following Patent Document 1 discloses a configuration in which, by disposing a ¼ wavelength (λ/4) plate on the side of a front surface of the reflecting mirror as a phase difference plate, linear polarization in a specific direction of the reflected light generated by the reflection polarizing plate becomes circular polarization by passing through the λ/4 plate once, and by passing through the λ/4 plate again while being reflected by the reflecting mirror, when it reenters the reflection polarizing plate by becoming a linear polarization rotated 90° from the specific direction, most of the light components pass through the reflection polarizing plate. In addition, it also discloses a configuration in which a ½ wavelength (λ/2) plate is disposed at an angle of 22.5° with respect to a polarization axis as a phase difference plate, which functions as the ¼ wavelength (λ/4) plate.

CITATION LIST

Patent Document

[Patent Document 1]
Japanese Unexamined Patent Application, First Publication No. 2018-185895

SUMMARY OF INVENTION

Technical Problem

Incidentally, in the above-mentioned Patent Document 1, optical loss is caused when light passes through the phase difference plate twice. For this reason, the challenge was to reduce the optical loss caused by light passing through the phase difference plate twice and to increase efficiency of utilization of the light from the reflection polarizing plate.

An aspect of the present invention is directed to providing a vehicular lamp capable of increasing efficiency of utilization of light when light emitted from a light source is separated into light with two polarized components and each of the light of the polarized components is controlled and used in liquid crystal elements, and an optical element appropriately used for such a vehicular lamp.

Solution to Problem

In order to achieve the aforementioned objects, the present invention provides the following configurations.

(1) A vehicular lamp including:

a light source;

a liquid crystal element configured to variably modulate a polarized state of light emitted from the light source;

a condensing optical system configured to condense the light emitted from the light source toward the liquid crystal element;

a polarization beam splitter configured to transmit first light constituted by one polarized component of the light condensed by the condensing optical system toward the liquid crystal element and to reflect second light constituted by other polarized component;

a reflecting condensing optical system configured to reflect and condense the second light reflected by the polarization beam splitter toward the liquid crystal element; and a polarization rotation element that is disposed only in any one of the optical path of the second light from the reflecting condensing optical system toward the polarization beam splitter and the optical path of the second light from the polarization beam splitter toward the reflecting condensing optical system and that is configured to rotate a polarization direction of the second light to coincide with a polarization direction of the first light, wherein the first light and the second light condensed toward the liquid crystal element are condensed at a first condensing point in common and the liquid crystal element is located at the first condensing point, and the second light reflected by the polarization beam splitter is condensed at a second condensing point deviated from the optical path of the light from the condensing optical system toward the polarization beam splitter and the optical path of the second light from the reflecting condensing optical system toward the polarization beam splitter.

(2) The vehicular lamp according to the above-mentioned (1), wherein the polarization rotation element is disposed only in the optical path of the second light from the reflecting condensing optical system toward the polarization beam splitter, and the polarization rotation element is disposed to overlap neither the optical path of the light from the condensing optical system toward the polarization beam splitter nor the optical path of the second light from the polarization beam splitter toward the reflecting condensing optical system.

(3) The vehicular lamp according to the above-mentioned (1) or (2), wherein the polarization beam splitter is disposed to face the liquid crystal element at a predetermined inclination, and a distance between a region of the polarization beam splitter through which the first light passes and the liquid crystal element is greater than a distance between a region of the polarization beam splitter through which the second light passes and the liquid crystal element.

(4) The vehicular lamp according to any one of the above-mentioned (1) to (3), wherein the condensing optical system comprises a first reflector having an elliptical reflecting surface that has the light source and the first condensing point as a focus, the reflecting condensing optical system includes a second reflector having an elliptical reflecting surface that has the first condensing point and the second condensing point as a focus, and a distance between the light source and the first condensing point is greater than a distance between the second condensing point and the first condensing point.

(5) The vehicular lamp according to the above-mentioned (4), wherein the second condensing point is located below an optical axis that connects the light source and the first condensing point.

(6) The vehicular lamp according to any one of the above-mentioned (1) to (5), wherein inclination angles of each of an optical axis of the first light and an optical axis of the second light entering the liquid crystal element with respect to a center axis of the liquid crystal element are 40° or less.

(7) The vehicular lamp according to any one of the above-mentioned (1) to (6), wherein the polarization rotation element is a ½ wavelength plate.

(8) The vehicular lamp according to any one of the above-mentioned (1) to (6), wherein the polarization rotation element comprises a liquid crystal layer having a 90° torsional orientation, and a retardation value of the liquid crystal layer is 1 μm or more.

(9) The vehicular lamp according to any one of the above-mentioned (1) to (8) including a condensing adjusting element that is disposed in the optical path of the second light from the reflecting condensing optical system toward the polarization rotation element and that is configured to adjust the second light to be condensed at the first condensing point.

(10) The vehicular lamp according to any one of the above-mentioned (1) to (9) including an optical element in which the polarization beam splitter and the polarization rotation element are integrated.

(11) The vehicular lamp according to the above-mentioned (10), wherein the optical element is constituted by:

a pair of boards disposed to face each other;

a partition wall configured to divide a space between the pair of boards into a first region and a second region;

a seal member configured to surround the first region, the second region and the partition wall, between the pair of boards;

an optical isotropic layer fitted in the first region;

the polarization beam splitter disposed on a facing surface of any one of the pair of boards in the first region; and a liquid crystal layer that is fitted in the second region, and that has a 90° torsional orientation and that has a retardation value of 1 μm or more.

(12) The vehicular lamp according to any one of the above-mentioned (1) to (11) including a polarization plate that is disposed in front of the liquid crystal element and that transmits light of a specified polarized component of the light modulated by the liquid crystal element; and a projection optical system that is disposed in front of the polarization plate and that is configured to project the light transmitted through the polarization plate forward.

(13) An optical element in which a polarization beam splitter and a polarization rotation element are integrated, the optical element including:

a pair of boards disposed to face each other;

an optical isotropic layer sandwiched between the pair of boards;

a liquid crystal layer sandwiched between the pair of boards; and a partition wall configured to divide between the optical isotropic layer and the liquid crystal layer, wherein the polarization beam splitter is provided to correspond to a first region including the optical isotropic layer, and the polarization rotation element is provided to correspond to a second region including the liquid crystal layer.

(14) The optical element according to the above-mentioned (13), wherein a reflecting polarizing layer is provided to correspond to the first region on a surface facing the optical isotropic layer and the liquid crystal layer of one of a board among the pair of boards, and an orientation control layer is provided to correspond to the second region on a surface facing the liquid crystal layer of other board among the pair of boards.

(15) The optical element according to the above-mentioned (14), wherein the reflecting polarizing layer is constituted by an optical multilayer film using an extension polymer, the liquid crystal layer has a 90° torsional orientation between the reflecting polarizing layer and the orientation control layer, and a retardation value of the liquid crystal layer is 1 μm or more.

(16) The optical element according to any one of the above-mentioned (13) to (15), wherein the optical isotropic layer and the liquid crystal layer are partially or entirely polymerized.

Advantageous Effects of Invention

According to the aspects of the present invention, it is possible to provide a vehicular lamp capable of increasing efficiency of utilization of light when light emitted from a light source is separated into light with two polarized components and each of the light of the polarized components is controlled and used in liquid crystal elements, and an optical element appropriately used for such a vehicular lamp.

DESCRIPTION OF EMBODIMENTS

Figure 1:
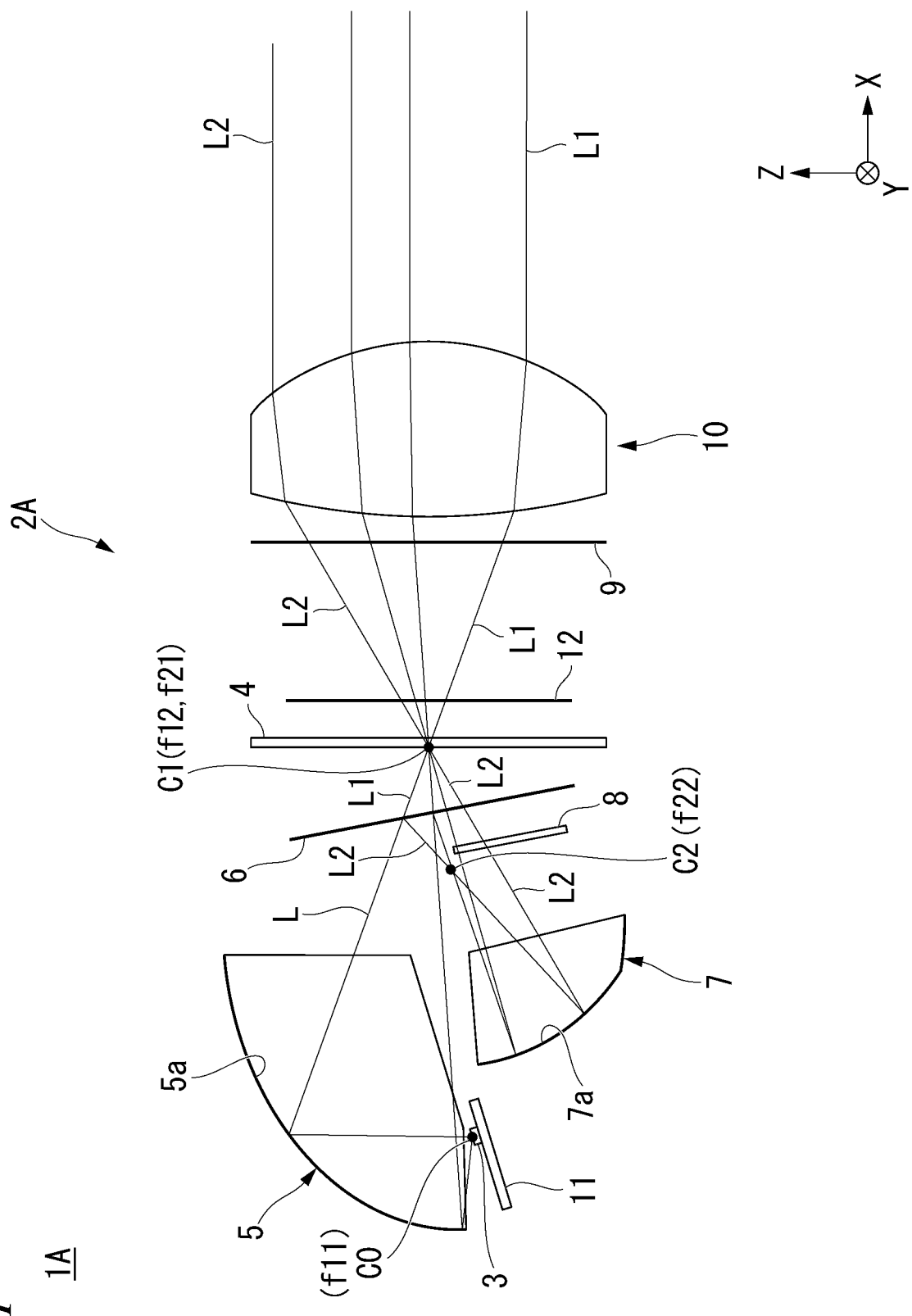
FIG. 1 is a cross-sectional view showing a configuration of a vehicular lamp according to a first embodiment of the present invention.

Hereinafter, embodiments of the present invention will be described in detail with reference to the accompanying drawings.

Further, in the drawings used in the following description, in order to make each component easier to see, a dimensional scale may be changed depending on the component, and a dimensional ratio or the like of each component may not always be the same as the actual one.

In addition, in the drawings described below, an XYZ orthogonal coordinate system is set, with an X-axis direction indicating a forward/rearward direction (longitudinal direction) of a vehicular lamp, a Y-axis direction indicating a leftward/rightward direction (widthwise direction) of the vehicular lamp, and a Z-axis direction indicating an upward/downward direction (height direction) of the vehicular lamp.

First Embodiment

First, as a first embodiment of the present invention, for example, a vehicular lamp 1A shown in FIG. 1 will be described.

Further, FIG. 1 is a cross-sectional view showing a configuration of the vehicular lamp 1A.

The vehicular lamp 1A of the embodiment is obtained by, for example, applying the present invention to a variable light distribution headlamp (ADB) configured to variably control a light distribution pattern of light projected forward from a vehicle as a headlight (headlamp) for a vehicle mounted on the front of the vehicle.

Specifically, the vehicular lamp 1A includes a lighting unit 2A as shown in FIG. 1. The vehicular lamp 1A has a structure in which the lighting unit 2A is disposed inside a lighting body constituted by a housing with a front surface (not shown) that is open, and a transparent lens cover configured to cover an opening of the housing.

The lighting unit 2A of the embodiment includes a light source 3, a liquid crystal element 4, a condensing optical system 5, a polarization beam splitter (PBS) 6, a reflecting condensing optical system 7, a polarization rotation element 8, a polarization plate 9, and a projection optical system 10.

The light source 3 is configured to emit unpolarized (non-polarized) light L. In the embodiment, as the light source 3, for example, a light emitting element such as a light emitting diode (LED) or the like configured to emit white light is used. The light source 3 radially emits light L emitted from the LED upward (a +Z axis) in a state in which the LED is mounted on one surface (an upper surface in the embodiment) of a mounting board 11.

Further, in addition to the above-mentioned LED, a light emitting element such as a laser diode (LD) may be used for the light source 3. In addition, light sources other than the above-mentioned light emitting element may be used. Further, the number of the light emitting elements is not limited to one and may be plural.

The mounting board 11 is constituted by a printed wiring board with at least one surface on which a wiring (not shown) electrically connected to the above-mentioned LED (the light source 3) is provided. When the light source 3 is constituted by a plurality of LEDs, the plurality of LEDs are mounted while arranged at equal intervals in a widthwise direction (Y-axis direction) of the mounting board 11.

Further, the light source 3 may have a configuration in which the mounting board 11 on which the above-mentioned LEDs are mounted and the circuit board on which an LED driving circuit configured to drive the LEDs is provided are separately disposed, and the mounting board and the circuit board are electrically connected via a wiring cord referred to as a harness. Accordingly, it is possible to protect the LED driving circuit from heat emitted from the LEDs.

In addition, the light source 3 may have a configuration in which a heat sink configured to radiate the heat emitted from the above-mentioned LEDs to the outside or a cooling fan configured to blow wind toward the heat sink is provided. Accordingly, it is possible to efficiently radiate the heat emitted from the LEDs to the outside.

The liquid crystal element 4 is constituted by a transmission type liquid crystal panel (LCD) disposed in front (on a +X axis side) of the condensing optical system 5. The liquid crystal element 4 controls an image (light distribution pattern) of light projected forward by the projection optical system 10 while variably modulating a polarized state of the light passing through the liquid crystal element 4 using a liquid crystal driving circuit (not shown) configured to control a driving voltage applied between electrodes.

Further, the liquid crystal element 4 may be a segment type in which a driving voltage applied between the electrodes in one segment is controlled to switch a modulation of light, or may be a dot matrix type in which a driving voltage applied between electrodes of each of dots (pixels) disposed in a matrix manner is controlled to switch modulation of light in an arbitrary area.

The condensing optical system 5 is constituted by a first reflector disposed above the light source 3 (hereinafter, referred to as "a first reflector 5").

The first reflector 5 has an elliptical reflecting surface 5a formed in a concave surface shape formed to draw an elliptical line with two focuses f11 and f12 in a vertical cross section thereof. The elliptical reflecting surface 5a causes a first focus f11 of the two focuses f11 and f12 to coincide with a light emitting point C0 of the light source 3, and causes a second focus f12 to coincide with a first condensing point C1 of the liquid crystal element 4. Accordingly, the first reflector 5 condenses the light L that has entered the elliptical reflecting surface 5a while reflecting this light L toward the liquid crystal element 4.

Further, the condensing optical system 5 is not limited to the one constituted by the above-mentioned reflector and may be constituted by a condensing lens. In this case, a front focus of the condensing lens may coincide with the light emitting point C0 of the light source 3, and a rear focus of the condensing lens may coincide with the first condensing point C1 of the liquid crystal element 4.

The PBS 6 is configured to separate light L emitted from the light source 3 into first light L1 constituted by a polarized component (for example, a P polarized component) on one side, and second light L2 constituted by a polarized component (for example, an S polarized component) on the other side. The PBS 6 is disposed in an optical path of light L from the first reflector 5 toward the liquid crystal element 4. The PBS 6 is provided to be inclined with respect to the liquid crystal element 4 in the vertical cross section. Specifically, the PBS 6 is disposed to face the liquid crystal element 4 at a predetermined inclination, and disposed such that a distance between a region of the PBS 6 through which the first light L1 passes and the liquid crystal element 4 is greater than a distance between a region of the PBS 6 through which the second light L2 passes and the liquid crystal element 4. Accordingly, the PBS 6 is disposed to face the liquid crystal element 4 and disposed such that an interval between the PBS 6 and the liquid crystal element 4 is increased at upper (the +Z axis) side.

In addition, the PBS 6 is provided to be inclined toward a side where the reflecting condensing optical system 7 is located (a lower side in the embodiment) opposite to a side where the first reflector 5 is located (an upper side in the embodiment) with respect to a center axis of the liquid crystal element 4.

Accordingly, the PBS 6 transmits the first light L1 of the light L condensed by the first reflector 5 toward the liquid crystal element 4 on the front side, and reflects the second light L2 toward the reflecting condensing optical system 7 on an oblique downward rear side.

In addition, the first light L1 that transmits through the PBS 6 is condensed at the first condensing point C1 located at a position that coincides with the liquid crystal element 4. Meanwhile, the second light L2 reflected by the PBS 6 is condensed at a second condensing point C2 located away from the optical path of the light L from the first reflector 5 toward the PBS 6 and the optical path of the second light L2 from a second reflector (reflecting condensing optical system) 7, which will be described below, toward the PBS 6, and then, diffused from the second condensing point C2 toward the second reflector 7.

That is, the second condensing point C2 is located not to overlap each of the optical path of the light L from the first reflector 5 toward the PBS 6 and the optical path of the second light L2 from the second reflector 7 toward the PBS 6. That is, the second condensing point C2 is located not to overlap both the optical path of the light L from the first reflector 5 toward the PBS 6 and the optical path of the second light L2 from the second reflector 7 toward the PBS 6. In addition, the second condensing point C2 is located below an optical axis that connects the light source 3 and the first condensing point C1.

Further, for the PBS 6, for example, a wire grid type, an optical multilayer film, or the like, may be used. In addition, the PBS 6 is not limited to a plate type having a flat plate shape, or may be a tube type obtained by combining two rectangular prisms.

The reflecting condensing optical system 7 is constituted by a second reflector (hereinafter, referred to as the second reflector 7) disposed below the first reflector 5 (a −Z axis side).

The second reflector 7 has an elliptical reflecting surface 7a having a concave surface shape formed to draw an elliptical line with two focuses f21 and f22 in a vertical cross section thereof. The elliptical reflecting surface 7a causes a first focus f21 of the two focuses f21 and f22 to coincide with the second condensing point C2 and causes a second focus f22 to coincide with the first condensing point C1 of the liquid crystal element 4. Accordingly, the second reflector 7 condenses the second light L2 that has entered the elliptical reflecting surface 7a while reflecting the second light L2 toward the liquid crystal element 4.

Accordingly, the first light L1 and the second light L2 condensed toward the liquid crystal element 4 are condensed at the first condensing point C1 common to each other. In addition, the liquid crystal element 4 is located at the first condensing point C1.

The polarization rotation element 8 is constituted by a ½ wavelength ($\lambda/2$) plate (hereinafter, referred to as "a $\lambda/2$ plate" 8) disposed in the optical path of the second light L2 from the second reflector 7 toward the PBS 6. In addition, the $\lambda/2$ plate 8 is disposed not to overlap each of the optical path of the light L from the first reflector 5 toward the PBS 6 and the optical path of the second light L2 from the PBS 6 toward the second reflector 7. The $\lambda/2$ plate 8 is disposed not to overlap both the optical path of the light L from the first reflector 5 toward the PBS 6 and the optical path of the second light L2 from the PBS 6 toward the second reflector 7.

In the embodiment, the $\lambda/2$ plate 8 is a liquid crystal polarization rotation element, and a liquid crystal layer thereof has a 90° twisted orientation. As the liquid crystal material, a twist nematic (TN) liquid crystal with a solid phase-liquid crystal phase transition temperature (Tc) of −39° C. and a liquid crystal-isotropic liquid phase transition temperature (Tni) of 152° C. is used.

In the embodiment, a liquid crystal polarization rotation element with a cell thickness of 12 μm and a liquid crystal material having $\Delta n = 0.16$ is consisted as the $\lambda/2$ plate 8, and a value of a retardation ($\Delta n \cdot d$) is set to 1 μm. The value of the retardation is desirably 1 μm or more and 3 μm or less. It is possible to suppress wavelength dispersion as the value of the retardation is increased, and suppress a decrease in uniformity of a liquid crystal material according to a cell thickness. In addition, the liquid crystal layer can also be polymerized to improve a thermal resistance.

The $\lambda/2$ plate 8 may be consisted using not only a liquid crystal polarization rotation element formed of a twist nematic liquid crystal but also a liquid crystal polarization rotation element formed of a liquid crystal in a homogeneous orientation (uniaxial orientation). When consisted by the liquid crystal in the homogeneous orientation, the $\lambda/2$ plate 8 can be set by inclining a slow axis by 45° with respect to the polarization axis of the light entering the liquid crystal polarization rotation element.

The $\lambda/2$ plate 8 may be constituted by not only the above mentioned liquid crystal deflection rotation element but also a wavelength plate consisted by a stretch film formed by stretching a plastic material such as polycarbonate, cycloolefin polymer, or the like, or a liquid crystal coating type phase difference film obtained by applying an oriented film on a transparent supporting body and laminating an optical anisotropic layer containing a liquid crystal molecule such as a discotheque liquid crystal, a nematic liquid crystal, or the like, after rubbing processing.

Further, the λ/2 plate 8 can also be constituted by a phase difference plate, a crystal wavelength plate, and a sapphire wavelength plate that form a periodic uneven structure in which an inorganic material layer coated on a glass board is formed by a nanoimprint technology. Using a twist nematic liquid crystal as the λ/2 plate 8 is more preferable than other wavelength plates because the polarization stabilized at a broadband wavelength can be configured at low cost with a high thermal resistance.

The λ/2 plate 8 causes the polarization direction of the second light L2 from the second reflector 7 toward the PBS 6 to coincide with the polarization direction of the first light L1 by rotating the polarization direction of the second light L2 by 90° and converting the polarization direction of the second light L2 from the S polarization to the P polarization. Accordingly, the second light L2 from the λ/2 plate 8 toward the PBS 6 passes through the PBS 6, and is condensed at the first condensing point C1 of the liquid crystal element 4.

The polarization plate 9 is disposed in front of the liquid crystal element 4. The polarization plate 9 transmits the light of the specified polarized component of the first light L1 and the second light L2 modulated by the liquid crystal element 4. That is, the polarization plate 9 transmits the light of the polarized component corresponding to the light distribution pattern of the light controlled by the liquid crystal element 4, and shields the light of the other polarized component. Accordingly, depending on the light distribution pattern of the light controlled by the liquid crystal element 4, the first light L1 and the second light L2 modulated by the liquid crystal element 4 can be selectively transmitted.

In addition, an optical compensation plate 12 configured to compensate a phase difference between the first light L1 and the second light L2 modulated by the liquid crystal element 4 according to necessity may be disposed in the optical path between the polarization plate 9 and the liquid crystal element 4. The optical compensation plate 12 can improve a degree of polarization of the first light L1 and the second light L2 modulated by the liquid crystal element 4. As a result, it is possible to improve a contrast of the light distribution pattern of the light controlled by the liquid crystal element 4.

Further, since heat is generated from the polarization plate 9 by shielding (absorbing) the above-mentioned light, the polarization plate 9 is preferably separated from the liquid crystal element 4.

The projection optical system 10 is constituted by at least one or a plurality of (in the embodiment, one) projection lens (hereinafter, referred to as "a projection lens 10") disposed in front of the polarization plate 9. The liquid crystal element 4 is disposed according to a rear focus f3 of the projection lens 10. That is, the liquid crystal element 4 is located at the rear focus f3 of the projection lens 10 or in the vicinity thereof. The projection lens 10 projects the first light L1 and the second light L2 passing through the polarization plate 9 forward.

In the vehicular lamp 1A of the embodiment having the above-mentioned configuration, a region to be shielded is calculated by determining surrounding information such as a preceding vehicle, an oncoming vehicle, or the like, using the image obtained from the camera provided in the vehicle or information of various sensors provided in the vehicle, and the information of the region to be shielded is transmitted to the liquid crystal driving circuit as a control signal by the control circuit unit (not shown) configured to control the lighting unit 2A.

The liquid crystal driving circuit controls an image (light distribution pattern) of the first light L1 and the second light L2 projected by the projection lens 10 while controlling driving of the liquid crystal element 4 on the basis of the control signal from the control circuit unit. Accordingly, it is possible to variably control the light distribution pattern of the first light L1 and the second light L2 projected toward a side in front of the vehicle from the projection lens 10.

That is, the vehicular lamp 1A of the embodiment, as the ADB, can recognize surrounding circumstances such as a preceding vehicle, an oncoming vehicle, or the like, using the in-vehicle camera or the like, and can enlarge a front field of view of a driver at nighttime by shielding the light that gives glare to the preceding vehicle or the oncoming vehicle.

Incidentally, in the vehicular lamp 1A of the embodiment, the second condensing point C2 where the second light L2 reflected by the PBS 6 is condensed is located at a position deviated from the above mentioned optical path of the light L from the first reflector 5 toward the PBS 6 and the optical path of the second light L2 from the second reflector 7 toward the PBS 6. That is, the second condensing point C2 is located not to overlap each of the optical path of the light L from the first reflector 5 toward the PBS 6 and the optical path of the second light L2 from the second reflector 7 toward the PBS 6. That is, the second condensing point C2 is located not to overlap both the optical path of the light L from the first reflector 5 toward the PBS 6 and the optical path of the second light L2 from the second reflector 7 toward the PBS 6.

In addition, in the vehicular lamp 1A of the embodiment, the λ/2 plate 8 is disposed only in the optical path of the second light L2 from the second reflector 7 toward the PBS 6 so as not to overlap each of the optical path of the first light L1 from the first reflector 5 toward the PBS 6 and the optical path of the second light L2 from the PBS 6 toward the second reflector 7. In the vehicular lamp 1A of the embodiment, the λ/2 plate 8 is disposed only in the optical path of the second light L2 from the second reflector 7 toward the PBS 6 so as not to overlap both the optical path of the first light L1 from the first reflector 5 toward the PBS 6 and the optical path of the second light L2 from the PBS 6 toward the second reflector 7.

Accordingly, in the vehicular lamp 1A of the embodiment, only the second light L2 from the second reflector 7 toward the PBS 6 can be made to enter the λ/2 plate 8 without causing the second light L2 from the PBS 6 toward the second reflector 7 to enter the λ/2 plate 8.

In addition, the λ/2 plate 8 rotates the polarization direction of the second light L2 from the second reflector 7 toward the PBS 6 by 90°, and converts the polarization direction of the second light L2 from the S polarization to the P polarization. Accordingly, it is possible to match (align) the polarization direction of the second light L2 entering the PBS 6 with the polarization direction of the first light L1.

Accordingly, in the vehicular lamp 1A of the embodiment, a quantity of light of the first light L1 and the second light L2 transmitting through the PBS 6 and entering the liquid crystal element 4 can be increased, and it is possible to cause the polarization directions of the first light L1 and the second light L2 entering the liquid crystal element 4 to match (align) with each other.

In addition, in the vehicular lamp 1A of the embodiment, the distance between the light source 3 and the first condensing point C1 is greater than the distance between the second condensing point C2 and the first condensing point C1. Accordingly, the λ/2 plate 8 can be disposed only in the optical path of the second light L2 from the second reflector 7 toward the PBS 6 while miniaturizing the second reflector 7.

In addition, in the vehicular lamp 1A of the embodiment, each of the inclination angles of the optical axis of the first light L1 and the optical axis of the second light L2 entering the liquid crystal element 4 with respect to the center axis of the liquid crystal element 4 is set to 40° or less.

Accordingly, it is possible to appropriately control the light distribution pattern of the first light L1 and the second light L2 modulated by the liquid crystal element 4 while suppressing the angles (incidence angles) of the first light L1 and the second light L2 entering the liquid crystal element 4 to a small low angle. In addition, it is possible to reduce an influence on viewing angle dependency of the liquid crystal element 4 and increase a quantity of light of the first light L1 and the second light L2 entering the projection lens 10 through the liquid crystal element 4.

As described above, in the vehicular lamp 1A of the embodiment, efficiency of utilization of the light L when the light L is separated into the lights L1 and L2 of the two polarized components emitted from the light source 2 and each of the lights L1 and L2 of the polarized components are controlled by the liquid crystal element 4 and are used can be increased by providing the above mentioned lighting unit 2A. In particular, the optical loss by transmission through the phase difference plate can be reduced and the efficiency of utilization of the light can be increased. In addition, in the vehicular lamp 1A of the embodiment, it is possible to suppress an increase in the number of parts and an increase in size of the lighting unit 2A.

Second Embodiment

Figure 2:
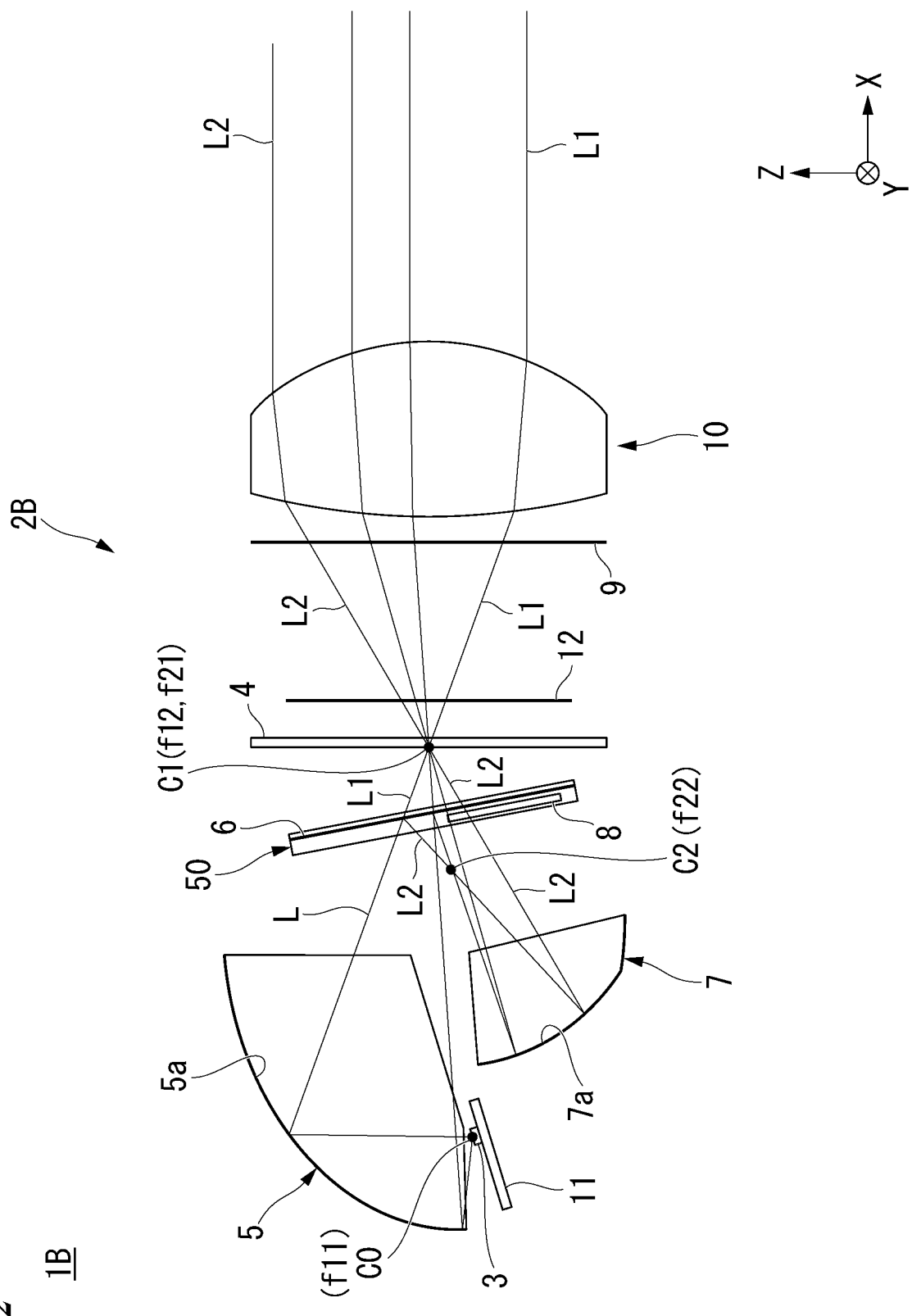
FIG. 2 is a cross-sectional view showing a configuration of a vehicular lamp according to a second embodiment of the present invention.
Figure 3:
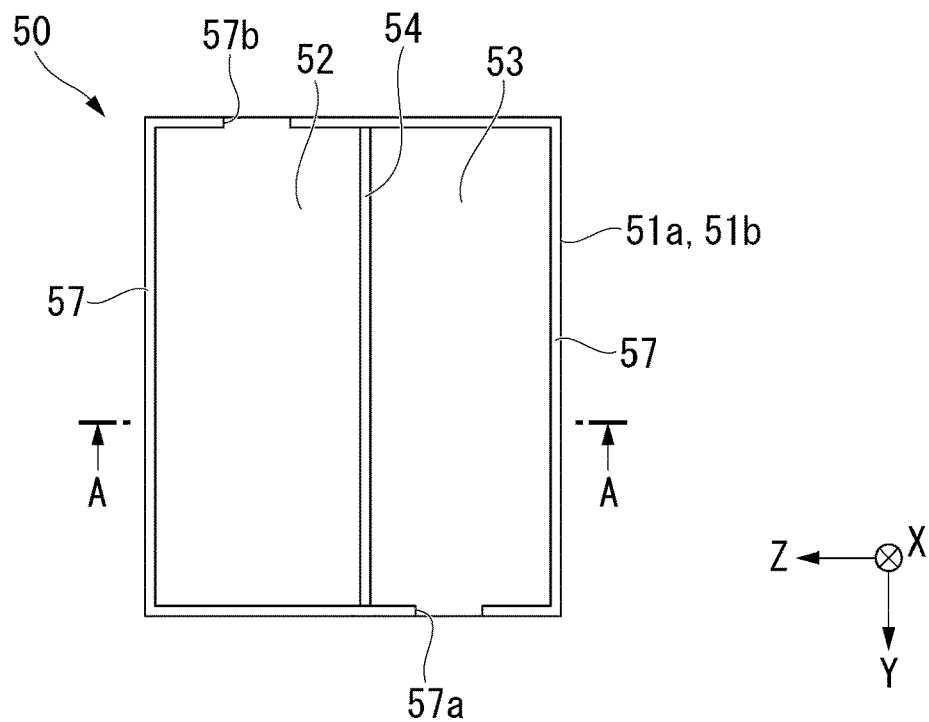
FIG. 3 is a plan view showing a configuration of an optical element provided in the vehicular lamp shown in FIG. 2.
Figure 4:
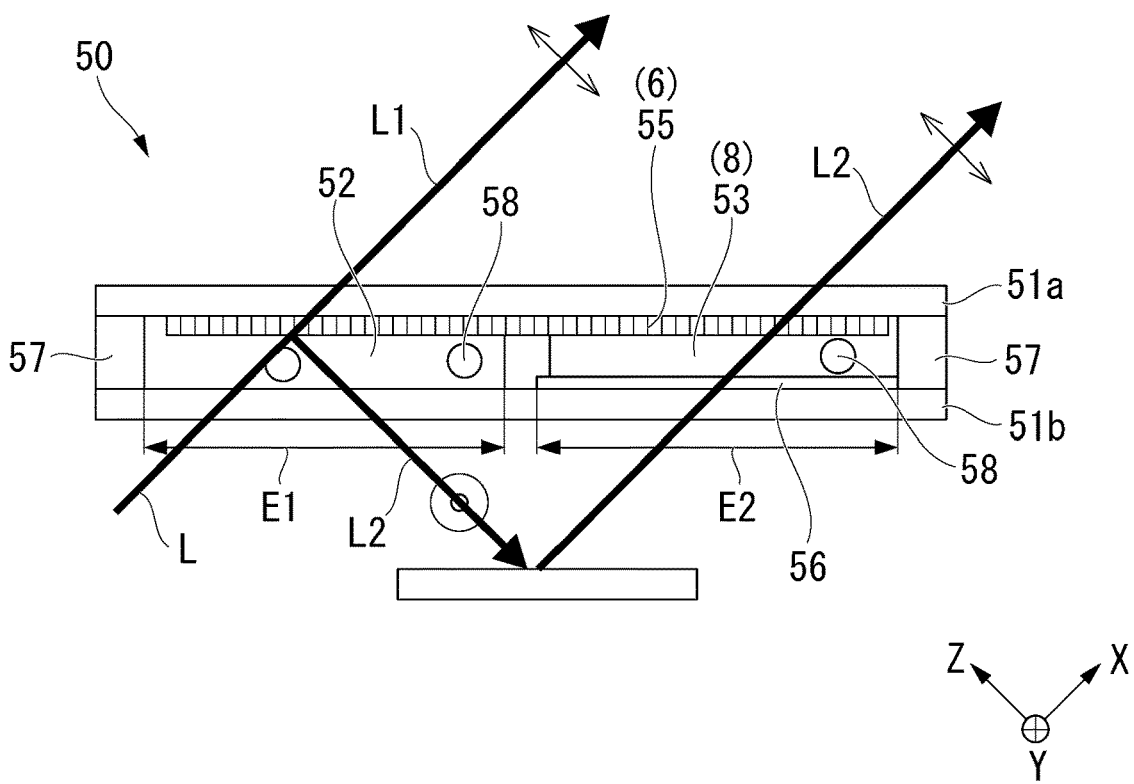
FIG. 4 is a plan view of the optical element along a line segment A-A shown in FIG. 3.

Next, as a second embodiment of the present invention, for example, a vehicular lamp 1B and an optical element 50 shown in FIG. 2 to FIG. 4 will be described. Further, FIG. 2 is a cross-sectional view showing a configuration of the vehicular lamp 1B. FIG. 3 is a plan view showing a configuration of the optical element 50 provided in the vehicular lamp 1B. FIG. 4 is a plan view of the optical element 50 along line segment A-A shown in FIG. 3. In addition, in the following description, the same areas as the vehicular lamp 1A (the lighting unit 2A) are designated by the same reference signs in the drawings and description thereof will be omitted.

The vehicular lamp 1B of the embodiment includes a lighting unit 2B shown in FIG. 2. The lighting unit 2B includes the optical element 50 in which the PBS 6 and the polarization rotation element 8 are integrated. In addition, the polarization rotation element 8 is constituted by a liquid crystal layer having a 90° torsional orientation. Other than that, it has basically the same configuration as the lighting unit 2A.

As shown in FIG. 3 and FIG. 4, the optical element 50 has a pair of boards 51a and 51b disposed to face each other, an optical isotropic layer 52 fitted in a first region E1 between the pair of boards 51a and 51b, a liquid crystal layer 53 fitted in a second region E2 between the pair of boards 51a and 51b, and a partition wall 54 configured to divide a space between the optical isotropic layer 52 and the liquid crystal layer 53.

The PBS 6 is provided to correspond to the first region E1 and the second region E2 including the optical isotropic layer 52 and the liquid crystal layer 53. The polarization rotation element 8 is provided to correspond to the second region E2 including the liquid crystal layer 53.

That is, the first region E1 is a region that functions as the PBS 6 in a surface of the optical element 50, and is provided over a range to which the light L from the first reflector 5 toward the PBS 6 and the second light L2 from the second reflector 7 toward the PBS 6 enters. A reflecting polarizing layer 55 is provided to correspond to the first region E1 in a surface (inner surface) of the one board 51a of the pair of boards 51a and 51b facing the optical isotropic layer 52 and the liquid crystal layer 53. Further, the reflecting polarizing layer 55 is arbitrarily provided in the second region E2.

Meanwhile, the second region E2 is a region that functions as the polarization rotation element (the λ/2 plate) 8 in the surface of the optical element 50, and is provided over a range to which the second light L2 from the second reflector 7 toward the PBS 6 enters.

An orientation control layer 56 is provided to correspond to the second region E2 in a surface (inner surface) of the other board 51b facing the liquid crystal layer 53.

The pair of boards 51a and 51b are constituted by transparent isotropic members such as glass boards or the like. The optical isotropic layer 52 is formed of an optical matching material configured to eliminate (reduce) the refractive index difference with the boards 51a and 51b. In the embodiment, the pair of boards 51a and 51b are constituted by glass boards. The optical isotropic layer 52 is composed of an optical matching material with a refractive index of 1.5, which is close to the glass board. The liquid crystal layer 53 is composed of a twist nematic (TN) liquid crystal.

In the optical element 50, the surrounding of the pair of boards 51a and 51b facing each other is sealed by a seal member 57. In addition, on a part of the seal member 57, a first injection port 57a configured to inject a liquid crystal to one side (the second region E2) with respect to the partition wall 54 and a second injection port 57b configured to inject an optical matching material to the other side (the first region E1) with respect to the partition wall 54 are provided. The injection ports 57a and 57b are sealed after injecting the liquid crystal and the optical matching material. In addition, beads 58 configured to hold an opposing interval are provided to be dispersed in the liquid crystal and the optical matching material between the pair of boards 51a and 51b.

Here, a process of manufacturing the optical element 50 according to the embodiment will be described.

Further, the following manufacturing process is an example of the present invention and not limited to each manufacturing process and various materials.

First, the polyimide horizontal oriented film (the orientation control layer 56) is flexographically printed on the glass board 51b and rubbing process has been performed in the first direction.

First, on the glass board 51a, as the reflecting polarizing layer 55, an optical multilayer film type reflection polarizing plate is pasted such that the extension direction of the film is perpendicular to the first direction in the above mentioned rubbing processing, and it is tightly attached by an autoclave. Further, the rubbing processing perpendicular to the first direction may be performed on the reflecting polarizing layer and can be appropriately selected according to the material used in the reflecting polarizing layer 55.

Next, the seal member 57 is applied to the glass board 51a, a transparent seal member that constitutes the partition wall 54 is applied to the glass board 51b, and a gap control agent is sprayed and both boards are overlapped. The first injection port 57a and the second injection port 57b are formed upon application of the seal member 57.

Next, the liquid crystal material is injected from the first injection port 57a, the optical matching material is injected from the second injection port 57b, they are cured by ultraviolet light, and thus, the optical element 50 is manufactured. A chiral agent having chirality may be added to the liquid crystal material injected from the first injection port 57a in the same direction as the twist angle.

The reflecting polarizing layer 55 is constituted by an optical multilayer film using an extension polymer. The orientation control layer 56 is constituted by an organic oriented film or an inorganic oriented film. The liquid crystal layer 53 has a torsional orientation between the reflecting polarizing layer 55 and the orientation control layer 56. Accordingly, the liquid crystal layer 53, as the broadband λ/2 plate 8, can rotate the polarization direction by 90° regardless of a wavelength.

Here, spectrum characteristics of the optical element 50 will be described with reference to FIG. 5 and FIG. 6.

Figure 5:
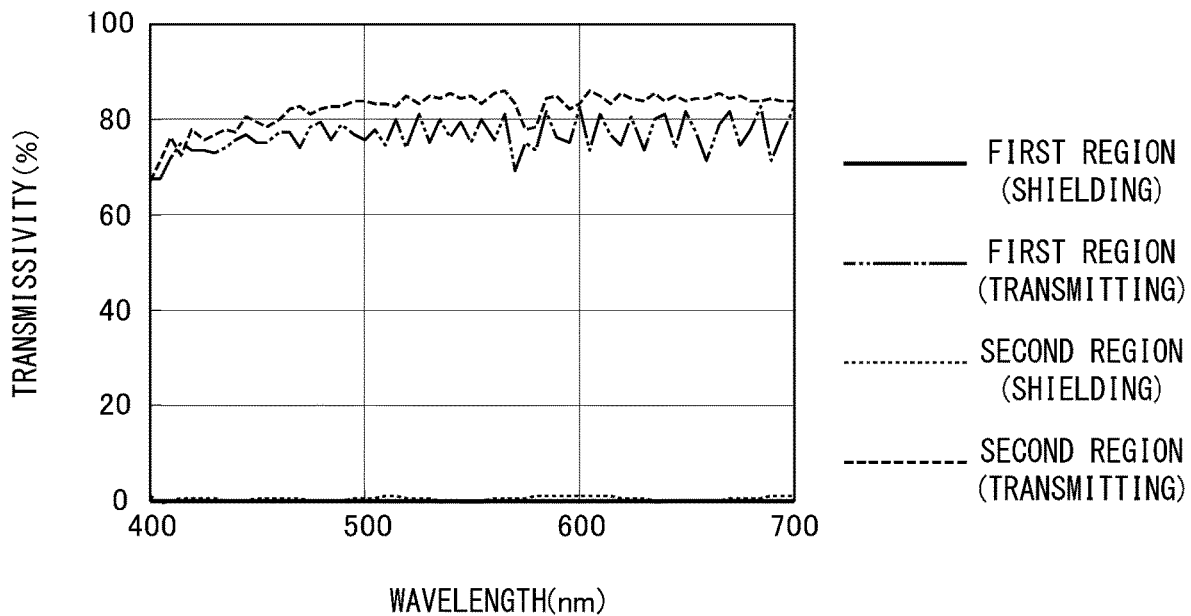
FIG. 5 is a graph showing transmission spectrum characteristics of the optical element.

Further, FIG. 5 is a graph showing transmission spectrum characteristics of the optical element 50. FIG. 6 is a graph showing reflection spectrum characteristics of the optical element 50.

Figure 6:
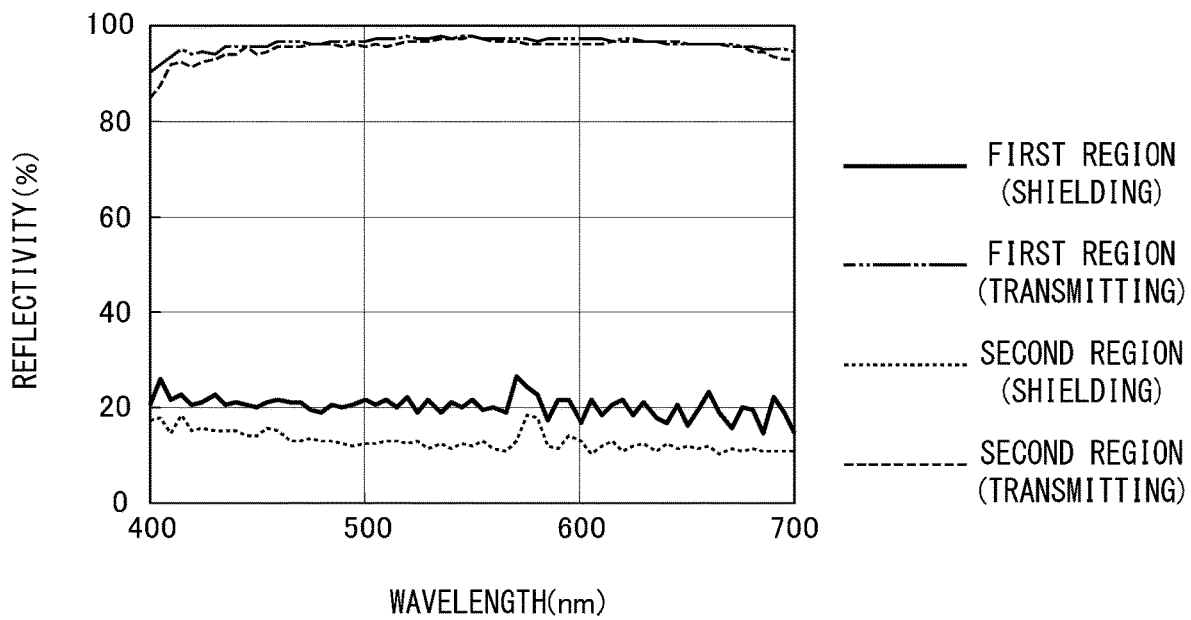
FIG. 6 is a graph showing reflection spectrum characteristics of the optical element.

In the embodiment, the transmission spectrum characteristics when the polarization plate is disposed with respect to the reflecting polarizing layer 55 of the optical element 50 with parallel nicols and when the polarization plate is disposed with crossed nicols are shown in FIG. 5, and the reflection spectrum characteristics are shown in FIG. 6.

As shown in FIG. 5 and FIG. 6, the first region E1 in which the optical isotropic layer 52 is provided shows a transmission state upon parallel nicols and shows a shielding state upon crossed nicols. Meanwhile, the second region E2 in which the liquid crystal layer 53 is provided shows a shielding state upon parallel nicols and shows a transmission state upon crossed nicols. In addition, transmission performance and shielding performance of the second region E2 are equal to those of the first region E1, and there is no wavelength dispersion. Accordingly, in the optical element 50 of the embodiment, it was found that the liquid crystal layer 53 has a very good function as the broadband λ/2 plate 8.

While the wavelength dispersion can be suppressed as the retardation value (Δn·d) of the liquid crystal layer 53 is increased, uniformity of the liquid crystal is degraded as the cell thickness is increased. Accordingly, from this point of view, the retardation value of the liquid crystal layer 53 is preferably 1 μm or more and 3 μm or less.

In the optical element 50, the optical isotropic layer 52 and the liquid crystal layer 53 are preferably partially or entirely polymerized. Accordingly, it is possible to achieve improvement of thermal resistance and light resistance of the optical element 50.

As shown in FIG. 2, the optical element 50 having the above-mentioned configuration is provided to be inclined with respect to the liquid crystal element 4. Specifically, the optical element 50 and the PBS 6 are disposed to face the liquid crystal element 4 at a predetermined inclination, and are disposed such that a distance between the region of the PBS 6 through which the first light L1 passes and the liquid crystal element 4 is greater than a distance between a region of the PBS 6 through which the second light L2 passes and the liquid crystal element 4. That is, the optical element 50 (the PBS 6) is disposed to face the liquid crystal element 4, and is disposed such that an interval between the optical element 50 (the PBS 6) and the liquid crystal element 4 is increased at upper (a +Z axis) side.

In addition, the optical element 50 is provided to be inclined toward a side where the second reflector 7 is located (in the embodiment, a lower side) opposite to a side where the first reflector 5 is located (in the embodiment, an upper side) with respect to a center axis of the liquid crystal element 4.

Accordingly, in the optical element 50, since the light L condensed by the first reflector 5 enters the reflecting polarizing layer 55 (the PBS 6) corresponding to the first region E1, the first light L1 separated by the reflecting polarizing layer 55 is transmitted toward the liquid crystal element 4 on the front side, and the second light L2 separated by the reflecting polarizing layer 55 is reflected toward the reflecting condensing optical system 7 on an oblique lower rear side.

In addition, the first light L1 transmitting through the optical element 50 is condensed at the first condensing point C1 located to coincide with the liquid crystal element 4. Meanwhile, the second light L2 reflected by the optical element 50 is condensed at the second condensing point C2 located to be deviated from the optical path of the light L from the first reflector 5 toward the optical element 50 and the optical path of the second light L2 from the second reflector 7 toward the PBS 6, and then, diffused toward the second reflector 7 from the second condensing point C2.

That is, the second condensing point C2 is located not to overlap the optical path of the light L from the first reflector 5 toward the optical element 50 and the optical path of the second light L2 from the second reflector 7 toward the optical element 50. The second condensing point C2 is located not to overlap both the optical path of the light L from the first reflector 5 toward the optical element 50 and the optical path of the second light L2 from the second reflector 7 toward the optical element 50.

In addition, the liquid crystal layer 53 (the λ/2 plate 8) corresponding to the second region E2 of the optical element 50 is disposed in the optical path of the second light L2 from the second reflector 7 toward the optical element 50. In addition, the liquid crystal layer 53 is disposed not to overlap the optical path of the light L from the first reflector 5 toward the optical element 50 and the optical path of the second light L2 from the optical element 50 toward the second reflector 7. The liquid crystal layer 53 is disposed not to overlap both the optical path of the light L from the first reflector 5 toward the optical element 50 and the optical path of the second light L2 from the optical element 50 toward the second reflector 7.

The optical element 50 rotates the polarization direction of the second light L2 entering the liquid crystal layer 53 by 90°, converts the polarization direction of the second light L2 from the S polarization to the P polarization, and thus, causes the polarization direction of the second light L2 to coincide with the polarization direction of the first light L1. Accordingly, the second light L2 entering the reflecting polarizing layer 55 (the PBS 6) corresponding to the second region E2 of the optical element 50 transmits through the optical element 50 and is condensed at the first condensing point C1 of the liquid crystal element 4.

Accordingly, in the vehicular lamp 1B of the embodiment, the quantity of light of the first light L1 and the second light L2 entering the liquid crystal element 4 through the optical element 50 can be increased, and it is possible to match (align) the polarization directions of the first light L1 and the second light L2 entering the liquid crystal element 4 with each other.

In addition, in the vehicular lamp 1B of the embodiment, further reduction in size of the lighting unit 2B can be achieved by providing the optical element 50 in which the PBS 6 and the polarization rotation element 8 are integrated. In addition, it is possible to improve reliability of the lighting unit 2B by providing the optical element 50 with good thermal resistance or light resistance.

As described above, in the vehicular lamp 1B of the embodiment, by providing the above mentioned lighting unit 2B, it is possible to increase the efficiency of utilization of the light L emitted from the light source 2 is separated into the lights L1 and L2 of the two polarized components and each of the lights L1 and L2 of the polarized components are controlled by the liquid crystal element 4 and used. In particular, optical loss due to transmission of the phase difference plate can be reduced and efficiency of utilization of the light can be increased. In addition, by providing the optical element 50 appropriately used for the above-mentioned vehicular lamp 1B, it is possible to suppress an increase in size of the lighting unit 2B and improve reliability while preventing an increase in the number of parts.

Here, the lighting unit 2A of the first embodiment and the lighting unit 2B of the second embodiment were fabricated, and evaluation of light flux was performed. For each of the lighting unit 2A and the lighting unit 2B, results obtained by performing light distribution measurement for each optical path of the first light L1 and the second light L2 are shown in the following Table 1.

TABLE 1

| Optical path | Light unit | | Change rate |
| --- | --- | --- | --- |
| | 2A | 2B | |
| L1 | 522 lm | 495 lm | −5% |
| L2 | 138 lm | 280 lm | 103% |
| Total | 660 lm | 775 lm | 17% |

From the results of the light distribution measurement described in Table 1, first, focusing on the first light L1, the lighting unit 2B of the second embodiment does not have a large change in light flux compared to the lighting unit 2A of the first embodiment.

Meanwhile, focusing on the second light L2, the lighting unit 2B of the second embodiment has the light flux that is increased by 103% compared to the lighting unit 2A of the first embodiment. In addition, focusing on the entire light flux also, the lighting unit 2B of the second embodiment has the light flux that is increased by 17% compared to the lighting unit 2A of the first embodiment.

Accordingly, in the lighting unit 2B of the second embodiment, it was confirmed that the optical loss can be further reduced by integrating the PBS 6 and the polarization rotation element 8.

Further, the present invention is not particularly limited to the embodiment and various changes may be made without departing from the scope of the present invention.

Specifically, in the above mentioned vehicular lamp 1B, while the configuration including the optical element 50 in which the PBS 6 and the polarization rotation element 8 are integrated is provided, for example, a configuration including optical elements 50A to 50G shown in FIG. 7A to FIG. 7G may be provided.

Figure 7A:
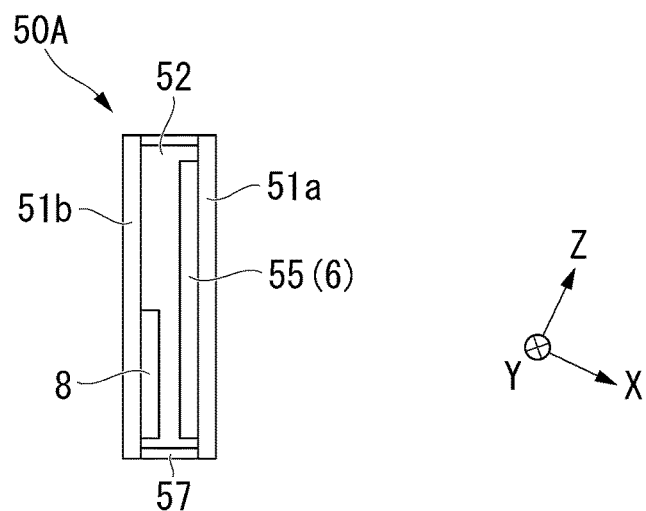
FIG. 7A is a cross-sectional view showing another configuration example of the optical element.

Among these, the optical element 50A shown in FIG. 7A has a configuration in which the optical isotropic layer 52 is provided between the pair of boards 51a and 51b, the PBS 6 (the reflecting polarizing layer 55) is provided to correspond to a region including the first region E1 on a surface (inner surface) facing the one board 51a, and the λ/2 plate 8 is provided to correspond to the second region E2 on a surface (inner surface) facing the other board 51b.

Figure 7B:
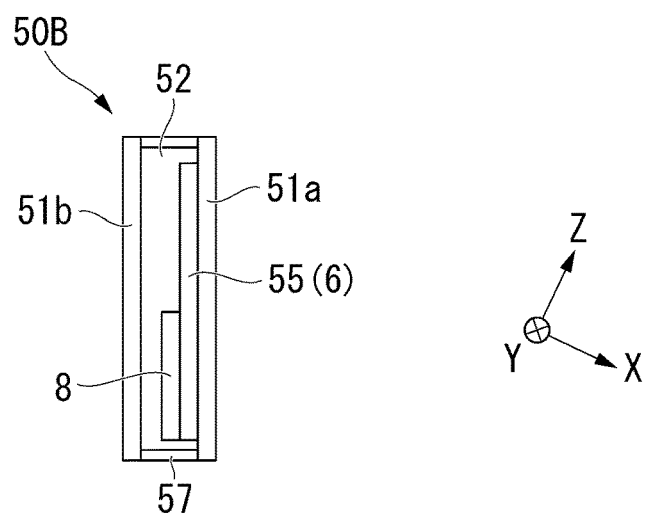
FIG. 7B is a cross-sectional view showing another configuration example of the optical element.

The optical element 50B shown in FIG. 7B has a configuration in which the optical isotropic layer 52 is provided between the pair of boards 51a and 51b, the PBS 6 (the reflecting polarizing layer 55) is provided to correspond to the region including the first region E1 on the surface (inner surface) facing the one board 51a, and the λ/2 plate 8 is provided to correspond to the second region E2 on the surface of the PBS 6 (the reflecting polarizing layer 55).

Figure 7C:
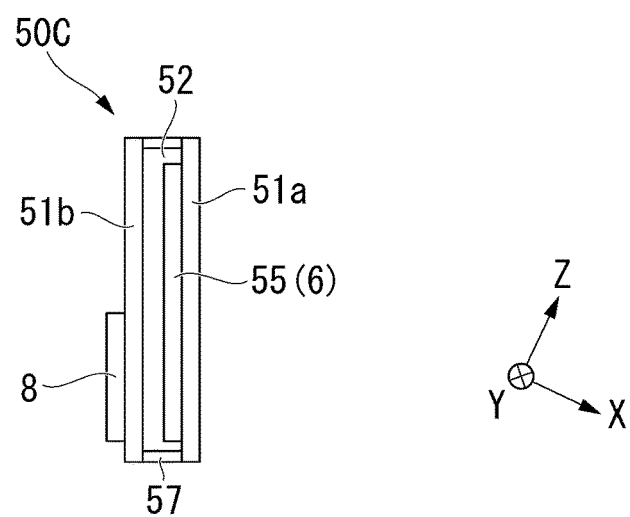
FIG. 7C is a cross-sectional view showing another configuration example of the optical element.

The optical element 50C shown in FIG. 7C has a configuration in which the optical isotropic layer 52 is provided between the pair of boards 51a and 51b, the PBS 6 (the reflecting polarizing layer 55) is provided to correspond to the region including the first region E1 on the surface (inner surface) facing the one board 51a, and the λ/2 plate 8 is provided to correspond to the second region E2 on a surface (outer surface) opposite to the side facing the other board 51b.

Figure 7D:
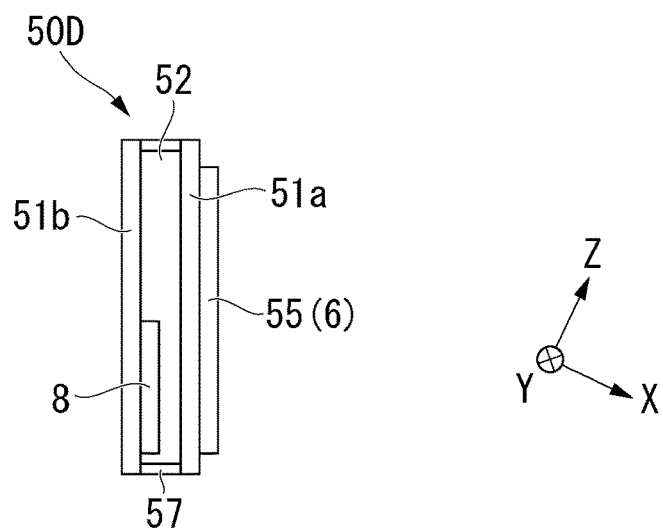
FIG. 7D is a cross-sectional view showing another configuration example of the optical element.

The optical element 50D shown in FIG. 7D has a configuration in which the optical isotropic layer 52 is provided between the pair of boards 51a and 51b, the PBS 6 (the reflecting polarizing layer 55) is provided to correspond to the region including the first region E1 on the surface (outer surface) opposite to the side facing the one board 51a, and the λ/2 plate 8 is provided to correspond to the second region E2 on the surface (inner surface) facing the other board 51b.

Figure 7E:
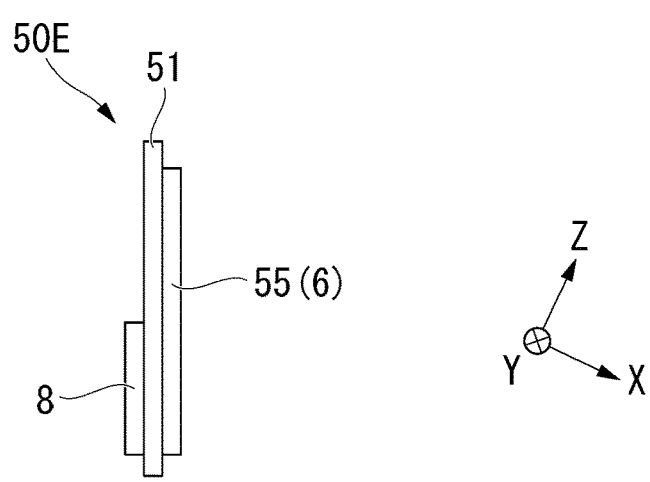
FIG. 7E is a cross-sectional view showing another configuration example of the optical element.

The optical element 50E shown in FIG. 7E has a configuration in which the PBS 6 (the reflecting polarizing layer 55) is provided to correspond to the region including the first region E1 on one surface of the board 51, and the λ/2 plate 8 is provided to correspond to the second region E2 on the other surface of the board 51.

Figure 7F:
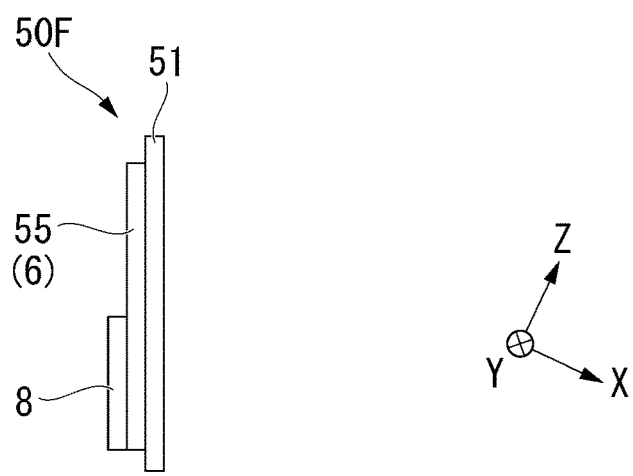
FIG. 7F is a cross-sectional view showing another configuration example of the optical element.

The optical element 50F shown in FIG. 7F has a configuration in which the PBS 6 (the reflecting polarizing layer 55) is provided to correspond to the region including the first region E1 on one surface of the board 51, and the λ/2 plate 8 is provided to correspond to the second region E2 on the surface of the PBS 6 (the reflecting polarizing layer 55).

Figure 7G:
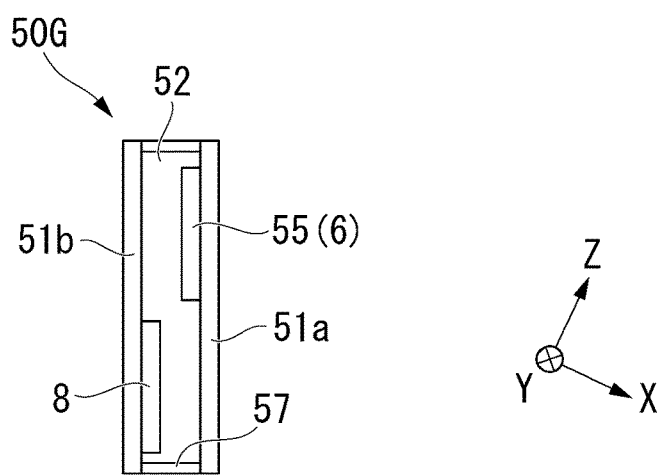
FIG. 7G is a cross-sectional view showing another configuration example of the optical element.

The optical element 50G shown in FIG. 7G has a configuration in which the PBS 6 (the reflecting polarizing layer 55) is provided to correspond to the first region E1 on one surface of the board 51, and the λ/2 plate 8 is provided to correspond to the second region E2 on a surface (inner surface) of the other board 51b facing the one surface.

Further, the optical elements 50B to 50F shown in FIG. 7B to FIG. 7F may have a configuration in which the PBS 6 (the reflecting polarizing layer 55) is formed in the region corresponding to the first region E1 as shown in FIG. 7G.

Figure 8A:
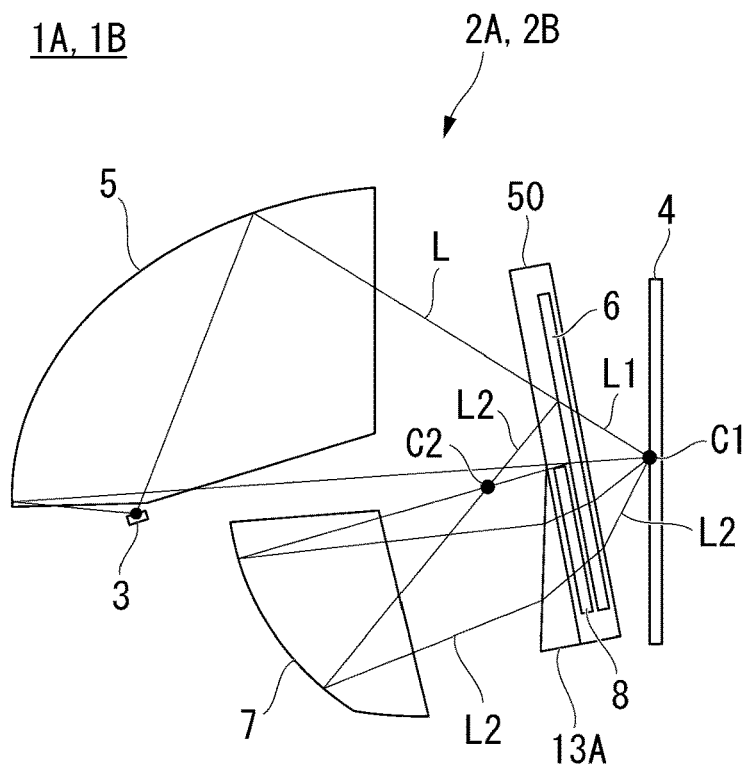
FIG. 8A is a cross-sectional view showing a configuration example of a condensing adjusting element.
Figure 8B:
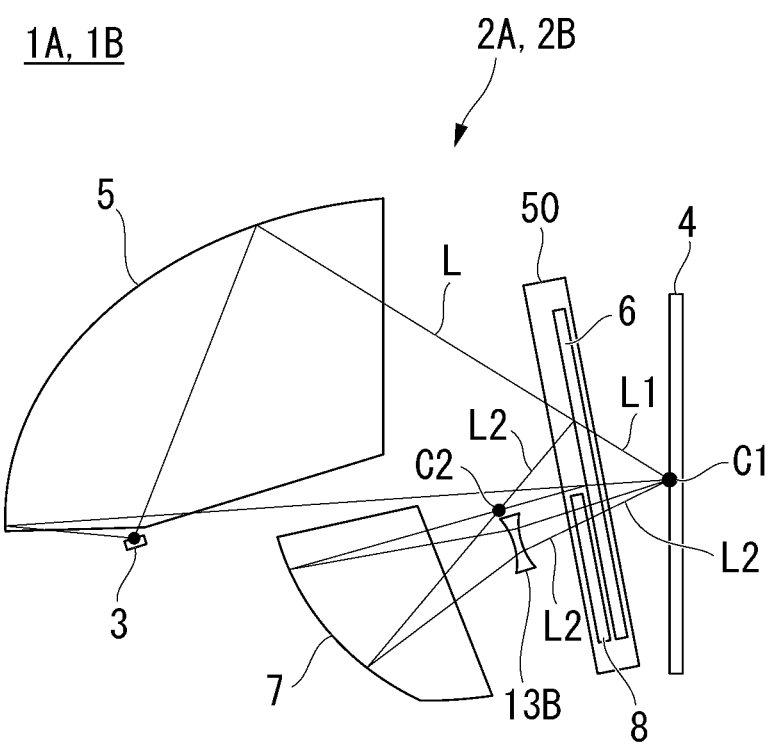
FIG. 8B is a cross-sectional view showing a configuration example of the condensing adjusting element.

In addition, in the above mentioned vehicular lamps 1A and 1B, for example, as shown in FIG. 8A and FIG. 8B, condensing adjusting elements 13A and 13B configured to adjust the second light L2 to be condensed at the first condensing point C1 may be disposed in the optical path of the second light L2 from the second reflector 7 toward the polarization rotation element 8 (the optical element 50). Accordingly, it is possible to provide a margin in disposition of the second reflector 7 and miniaturize the second reflector 7.

Among these, the condensing adjusting element 13A shown in FIG. 8A is a prism that condenses the second light L2 toward the first condensing point C1 while refracting the second light L2 entering the prism. When the prism is used, it is possible to make room for disposition of the second reflector 7 by shifting the second reflector 7 downward. In addition, it is also possible to dispose the miniaturized second reflector 7 closer to the front. Accordingly, it is possible to further miniaturize the lighting units 2A and 2B.

Meanwhile, the condensing adjusting element 13B shown in FIG. 8B is a concave lens that condenses the second light L2 toward the first condensing point C1 while diffusing the second light L2 entering this concave lens. When the concave lens is used, it is possible to dispose the miniaturized second reflector 7 closer to the front. Accordingly, it is possible to further miniaturize the lighting units 2A and 2B.

In the vehicular lamps 1A and 1B, while the polarization rotation element (the λ/2 plate) 8 is disposed only in the optical path of the second light L2 from the second reflector 7 toward the PBS 6, in some cases, the polarization rotation element (the λ/2 plate) 8 may be disposed only in the optical path of the second light L2 from the PBS 6 toward the second reflector 7.

Further, while the case in which the present invention is applied to the above-mentioned variable light distribution headlamp (ADB) has been exemplified in the embodiment, in addition to this, the present invention can also be applied to a variable light distribution type headlight system (adaptive front-lighting system (AFS)) configured to secure visibility in a vehicle advance direction by controlling a liquid crystal element according to a steering angle (cutting angle) or a speed (vehicle speed) of a traveling vehicle and enlarging an irradiation range of a passing beam in the vehicle advance direction.

In addition, the present invention can also be applied to a bi-function type vehicular lamp capable of switching between a light distribution pattern for a low beam including a cutoff line on an upper end as a passing beam (low beam) and a light distribution pattern for a high beam located above the light distribution pattern for a low beam as a traveling beam (high beam) using one lighting unit.

REFERENCE SIGNS LIST 1A, 1B Vehicular lamp
2A, 2B Lighting unit
3 Light source
4 Liquid crystal element
5 Condensing optical system (first reflector)
6 Polarization beam splitter (PBS)
7 Reflecting condensing optical system (second reflector)
8 Polarization rotation element (the λ/2 plate)
9 Polarization plate
10 Projection optical system (projection lens)
11 Mounting board
12 Optical compensation plate
13A, 13B Condensing adjusting element
50A to 50F Optical element
51, 51a, 51b Board
52 Optical isotropic layer
53 Liquid crystal layer
54 Partition wall
55 Reflecting polarizing layer
56 Orientation control layer
57 Seal member
58 Beads
L Light
L1 First light
L2 Second light
C1 First condensing point
C2 Second condensing point
E1 First region
E2 Second region

The invention claimed is:

1. A vehicular lamp comprising:
a light source;
a liquid crystal element configured to variably modulate a polarized state of light emitted from the light source;
a condensing optical system configured to condense the light emitted from the light source toward the liquid crystal element;
a polarization beam splitter configured to transmit first light constituted by one polarized component of the light condensed by the condensing optical system toward the liquid crystal element and to reflect second light constituted by other polarized component;
a reflecting condensing optical system configured to reflect and condense the second light reflected by the polarization beam splitter toward the liquid crystal element; and
a polarization rotation element that is disposed only in one of the optical path of the second light from the reflecting condensing optical system toward the polarization beam splitter and the optical path of the second light from the polarization beam splitter toward the reflecting condensing optical system and that is configured to rotate a polarization direction of the second light to coincide with a polarization direction of the first light,
wherein the first light and the second light condensed toward the liquid crystal element are condensed at a first condensing point in common and the liquid crystal element is located at the first condensing point, and
the second light reflected by the polarization beam splitter is condensed at a second condensing point deviated from the optical path of the light from the condensing optical system toward the polarization beam splitter and the optical path of the second light from the reflecting condensing optical system toward the polarization beam splitter.

2. The vehicular lamp according to claim 1, wherein the condensing optical system comprises a first reflector having an elliptical reflecting surface that has the light source and the first condensing point as a focus,
the reflecting condensing optical system includes a second reflector having an elliptical reflecting surface that has the first condensing point and the second condensing point as a focus, and
a distance between the light source and the first condensing point is greater than a distance between the second condensing point and the first condensing point.

3. The vehicular lamp according to claim 2, wherein the second condensing point is located below an optical axis that connects the light source and the first condensing point.

4. The vehicular lamp according to claim 1, comprising an optical element in which the polarization beam splitter and the polarization rotation element are integrated.

5. The vehicular lamp according to claim 4, wherein the optical element is constituted by:
a pair of boards disposed to face each other;
a partition wall configured to divide a space between the pair of boards into a first region and a second region;
a seal member configured to surround the first region, the second region and the partition wall, between the pair of boards;
an optical isotropic layer fitted in the first region;
the polarization beam splitter disposed on a facing surface of any one of the pair of boards in the first region; and a liquid crystal layer that is fitted in the second region, that has a 90° torsional orientation and that has a retardation value of 1 μm or more.

6. The vehicular lamp according to claim 1, wherein the polarization rotation element is disposed only in the optical path of the second light from the reflecting condensing optical system toward the polarization beam splitter, and
the polarization rotation element is disposed to overlap neither the optical path of the light from the condensing optical system toward the polarization beam splitter nor the optical path of the second light from the polarization beam splitter toward the reflecting condensing optical system.

7. The vehicular lamp according to claim 1, wherein the polarization beam splitter is disposed to face the liquid crystal element at a predetermined inclination, and a distance between a region of the polarization beam splitter through which the first light passes and the liquid crystal element is greater than a distance between a region of the polarization beam splitter through which the second light passes and the liquid crystal element.

8. The vehicular lamp according to claim 1, wherein inclination angles of each of an optical axis of the first light and an optical axis of the second light entering the liquid crystal element with respect to a center axis of the liquid crystal element are 40° or less.

9. The vehicular lamp according to claim 1, wherein the polarization rotation element is a ½ wavelength plate.

10. The vehicular lamp according to claim 1, wherein the polarization rotation element comprises a liquid crystal layer having a 90° torsional orientation, and
a retardation value of the liquid crystal layer is 1 μm or more.

11. The vehicular lamp according to claim 1, comprising a condensing adjusting element that is disposed in the optical path of the second light from the reflecting condensing optical system toward the polarization rotation element and that is configured to adjust the second light to be condensed at the first condensing point.

12. The vehicular lamp according to claim 1, comprising:
a polarization plate that is disposed in front of the liquid crystal element and that transmits light of a specified polarized component of the light modulated by the liquid crystal element; and
a projection optical system that is disposed in front of the polarization plate and that is configured to project the light transmitted through the polarization plate forward.

* * * * *